Patented Aug. 12, 1941

2,251,939

UNITED STATES PATENT OFFICE 2,251,939

TERTIARY ALCOHOLS OF THE CYCLOPENTANO POLYHYDRO PHENANTHRENE SERIES AND A METHOD OF PRODUCING THE SAME

Josef Kathol, Berlin, Germany, assignor, by mesne assignments, to Schering Corporation, Bloomfield, N. J., a corporation of New Jersey No Drawing. Application November 18, 1936, Serial No. 111,363. In France November 22, 1935

16 Claims. (Cl. 260—397.5)

The present invention relates to tertiary alcohols of the cyclopentano polyhydro phenanthrene series and especially to those tertiary alcohols of said series wherein the tertiary alcohol group is situated in the cyclopentano nucleus.

The method of producing said tertiary alcohols consists in that acetylene, suitably in the presence of alkali metals, such as sodium, lithium, etc., or alkali metal compounds, such as alkali metal amides, alcoholates, etc., is caused to react on unsaturated or unsaturated compounds of the cyclopentano polyhydro phenanthrene series containing a keto group in their cyclopentano nucleus and that the ethinyl compounds formed are eventually hydrogenated to the corresponding more or less saturated compounds.

As starting materials for performing the process of the present invention, for instance, the following keto compounds may be used: the follicle hormones oestrone, equiline, and equilenine, the male sex hormones androsterone, dehydro androsterone, their isomers and other cyclopentano polyhydro phenanthrene compounds containing a keto group.

Instead of acetylene also substituted acetylenes may be employed for carrying out the process of the present invention in which cases tertiary alcohols with a correspondingly longer side chain are obtained.

The reactions involved in the present invention may be explained, for instance, by the following structural formulas which relate to the transformation of follicle hormone into ethinyl dihydro follicle hormone and ethyl dihydro follicle hormone:

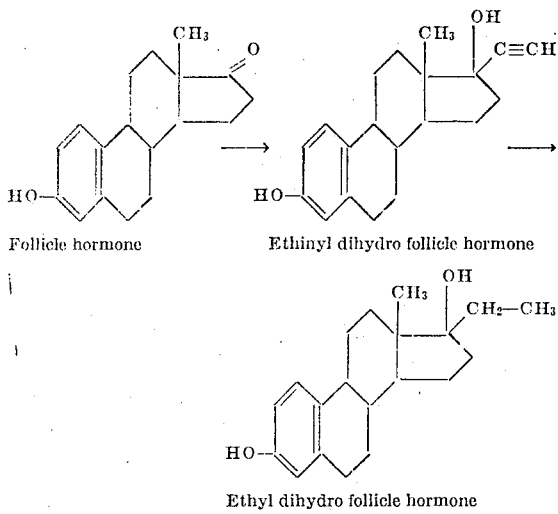

Follicle hormone    Ethinyl dihydro follicle hormone

Ethyl dihydro follicle hormone

The invention may be further illustrated by the following examples without, however, limiting the same to them:

Example 1

1 g. follicle hormone acetate is dissolved in 100 ccs. of absolute ether and caused to react with an excess of sodium amide, calculated for one mol. Thereafter acetylene is introduced into the ethereal solution until no more absorption takes place. The reaction product is decomposed with water and the mixture obtained extracted with ether. From the ethereal solution the unreacted starting material containing a keto group is separated off by means of ketone reagents. The remaining ethinyl dihydro follicle hormone acetate is hydrogenated, for instance, in the presence of platinum catalyst and the like, whereby the corresponding ethyl dihydro follicle hormone acetate is obtained.

Example 2

1 g. androsterone is caused to react with acetylene in the presence of sodium amide in the same manner as described in Example 1. On working up and hydrogenating the reaction product according to Example 1 the ethyl androstandiol is obtained.

Example 3

100 g. of a sodium amide suspension in benzene solution, containing 0.7 g. sodium amide are mixed with a solution of 5 g. dehydro androsterone acetate in benzene. In the mixture while stirring acetylene is introduced at room temperature until an amount of ammonia is evolved corresponding to theory, which may be achieved after about 42 hours. Thereafter the reaction mixture is decomposed with water and acidified with sulphuric acid; the benzene is separated off, washed with water, filtered and evaporated to dryness in vacuum. About 5–6 g. of a residue are obtained that for the most part is crystalline.

In order to purify the residue it is taken up with 300 ccs. of a 0.1 n alcoholic silver nitrate solution. By the addition of 400 ccs. of ether a white sticky substance is precipitated which represents the silver salt of the ethinyl androstendiol monoacetate. The precipitate is filtered off, washed with ether and again suspended in ether. The ethereal suspension is vigorously shaken with 4 n hydrochloric acid or potassium cyanide solution, whereby the silver salt of the ethinyl androstendiol monoacetate is decomposed, while silver chloride is precipitated or a solution of the complex potassium silver cyanide is formed, respectively. The ethereal solution is filtered, washed with water and evaporated to dryness. About 0.8 g. of a yellowish crystalline residue having an unsharp melting point is obtained; its composition corresponds to the expected formula $C_{23}H_{32}O_3$, the ethinyl androstendiol monoacetate.

Example 4

11.07 g. androstenolone acetate in 50 ccs. of benzene are slowly added to 30.6 g. of a sodium amide suspension in benzene containing 2.7 g. solid sodium amide while shaking and simultaneously introducing purified acetylene.

The acetylene is introduced for a further 24 hours and the reaction mixture is then decomposed with diluted acetic acid (1:1). The solution is extracted with ether and the ethereal extract washed with 1 n alkaline solution and water, whereafter it is evaporated to dryness. The residue is caused to react with semicarbazide in an alcoholic solution, whereby 4.8 g. of the semicarbazone of the androstenolone acetate of M. P. 288° C. are obtained. The mother liquor of the semicarbazone precipitation is mixed with ether, the ethereal solution washed with water and freed from water. On evaporating the ether the ethinyl androstendiol monoacetate remains which after recrystallisation from methanol has a melting point of 173° C. The yield amounts to 5.5 g.

Of course, various other modifications in the procedure of the process of the present invention may be resorted to within the scope of the appended claims without departing from the principles set forth herein.

The tertiary alcohols of the cyclopentano polyhydrophenanthrene series obtained according to the process of the present invention are valuable compounds as they possess either themselves a high physiological activity or can be transformed into physiologically valuable compounds or into intermediate products for the manufacture of physiologically active substances.

What I claim is:

1. Method of producing tertiary alcohols of the cyclopentano polyhydro phenanthrene series wherein the tertiary carbon is situated in the nucleus, comprising causing a member of the group consisting of acetylene and substituted acetylenes capable of combining with keto groups to react on compounds of the cyclopentano polyhydro phenanthrene series containing a keto group in one of the 3 and 17 positions, and then hydrogenating the ethinyl compounds so formed.

2. Method according to claim 1, wherein the reaction of the acetylene compound on the starting material is carried out in the presence of a member of the group consisting of alkali metals and alkali metal compounds.

3. Method of producing tertiary alcohols of the cyclopentano polyhydro phenanthrene series wherein the tertiary alcohol group is situated in the cyclopentano nucleus, comprising causing acetylene to react on a follicle hormone, and then hydrogenating the ethinyl compound so formed.

4. Method of producing tertiary alcohols of the cyclopentano polyhydro phenanthrene series wherein the tertiary alcohol group is situated in the cyclopentano nucleus, comprising causing acetylene to react on a ketone of the androstane series, and then hydrogenating the ethinyl compound so formed.

5. Tertiary alcohols of the cyclopentano polyhydro phenanthrene series of the general formula $C_mH_nORX$, wherein $m$ is 20 when $n$ is a number of the group consisting of 18, 20, 22 and 28, $m$ is 21 when $n$ is a number of the group consisting of 28 and 30, R stands for a member of the class consisting of the hydroxyl group and groups that, on hydrolysis, can be replaced by a hydroxyl group and is in one of the 3 and 17 positions, and X represents a member of the class consisting of hydrogen and hydrocarbon radicals and is in the other of the 3 and 17 positions.

6. An ethinyl dihydro follicle hormone compound of the general formula $C_{20}H_{23}OR$ and the structural formula

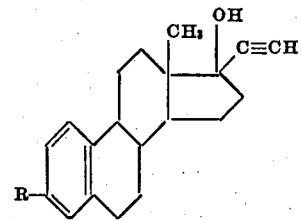

wherein R stands for a member of the class consisting of the hydroxyl group and groups that, on hydrolysis, can be replaced by a hydroxyl group.

7. Method according to claim 1, wherein the reaction of the acetylene compound on the starting material is carried out in the presence of an alkali metal.

8. Method according to claim 1, wherein the reaction of the acetylene compound on the starting material is carried out in the presence of an alkali metal amide.

9. Method according to claim 1, wherein the reaction of the acetylene compound on the starting material is carried out in the presence of an alcoholate.

10. Method of producing tertiary alcohols of the cyclopentano polyhydro phenanthrene series wherein the tertiary alcohol group is situated in the cyclopentano nucleus, comprising causing acetylene to react on androsterone, and then hydrogenating the ethinyl compound so formed.

11. Method of producing tertiary alcohols of the cyclopentano polyhydro phenanthrene series wherein the tertiary alcohol group is situated in the cyclopentano nucleus, comprising causing acetylene to react on dehydro-androsterone, and then hydrogenating the ethinyl compound so formed.

12. Method of producing tertiary alcohols of the cyclopentano polyhydro phenanthrene series comprising reacting a 17-keto cyclopentano polyhydro phenanthrene compound with a member of the group consisting of acetylene and hydrocarbon-substituted acetylenes, and then hydrogenating the ethinyl compound so formed.

13. Method according to claim 1, wherein a follicle hormone and acetylene are caused to react in the presence of a member of the group consisting of alkali metals and alkali metal compounds.

14. Method according to claim 1, wherein a ketone of the androstane series and acetylene are caused to react in the presence of a member of the group consisting of alkali metals and alkali metal compounds.

15. Method of producing tertiary alcohols of the cyclopentano polyhydro phenanthrene series, wherein the tertiary carbon is situated in the nucleus, comprising causing a member of the group consisting of acetylene and hydrocarbon-substituted acetylenes capable of combining with keto groups to react on compounds of the cyclopentano polyhydro phenanthrene series containing a keto group in one of the 3 and 17 positions in the presence of sodium, and then hydrogenating the ethinyl compounds so formed.

16. In a method of producing tertiary alcohols of the cyclopentano polyhydro phenanthrene series, wherein the tertiary carbon is situated in the nucleus, the step which comprises causing a member of the group consisting of acetylene and hydrocarbon-substituted acetylenes capable of combining with keto groups to react on a compound of the cyclopentano polyhydro phenanthrene series containing a keto group in one of the 3 and 17 positions in the presence of a member of the group consisting of alkali metals and alkali metal compounds.

JOSEF KATHOL.